United States Patent [19]
Adamski et al.

[11] 4,155,554
[45] May 22, 1979

[54] MINIATURE TARGET TANK

[75] Inventors: Ignatious E. Adamski, Sun City, Ariz.; Clarence H. Winfree, Warren, Mich.

[73] Assignee: The United States of America as represented by the Secretary of the Army, Washington, D.C.

[21] Appl. No.: 799,022

[22] Filed: May 20, 1977

[51] Int. Cl.² .......................... B62D 61/08; F41J 9/02
[52] U.S. Cl. ................................ 273/105.2; 46/219; 102/19; 180/98; 35/25; 273/105.6; 280/1.1 R; 280/92; 301/63 R; 180/27
[58] Field of Search ............... 180/27, 25, 98; 102/19; 273/105.2, 105.6; 280/1.1 R, 92; 301/63 R; 46/219; 35/25; 296/28 J

[56] References Cited
U.S. PATENT DOCUMENTS

| | | | |
|---|---|---|---|
| 1,269,179 | 6/1918 | Haynes | 301/63 R |
| 1,419,434 | 6/1922 | Wilson | 280/92 |
| 2,788,858 | 4/1957 | Aasland | 180/25 R |
| 3,303,821 | 2/1967 | Harris | 273/105.2 X |
| 3,330,371 | 7/1967 | Seaman | 180/27 X |
| 3,563,012 | 2/1971 | Strasel | 180/27 X |
| 3,664,532 | 5/1972 | Gustafson | 180/27 X |
| 3,917,270 | 11/1975 | Gothard | 273/105.2 |

*Primary Examiner*—John P. Silverstrim
*Attorney, Agent, or Firm*—Peter A. Taucher; John E. McRae; Nathan Edelberg

[57] ABSTRACT

A miniature vehicle usable by the military for target training. The vehicle contains a radio receiver and propulsion-steering means responsive to radio output for causing the vehicle to execute evasive maneuvers. A technician equipped with a radio sending set at a remote location causes the minature vehicle to execute unexpected evasive maneuvers, while soldiers undergoing training fire rifle rounds at the vehicle in a simulated battle field situation.

4 Claims, 7 Drawing Figures

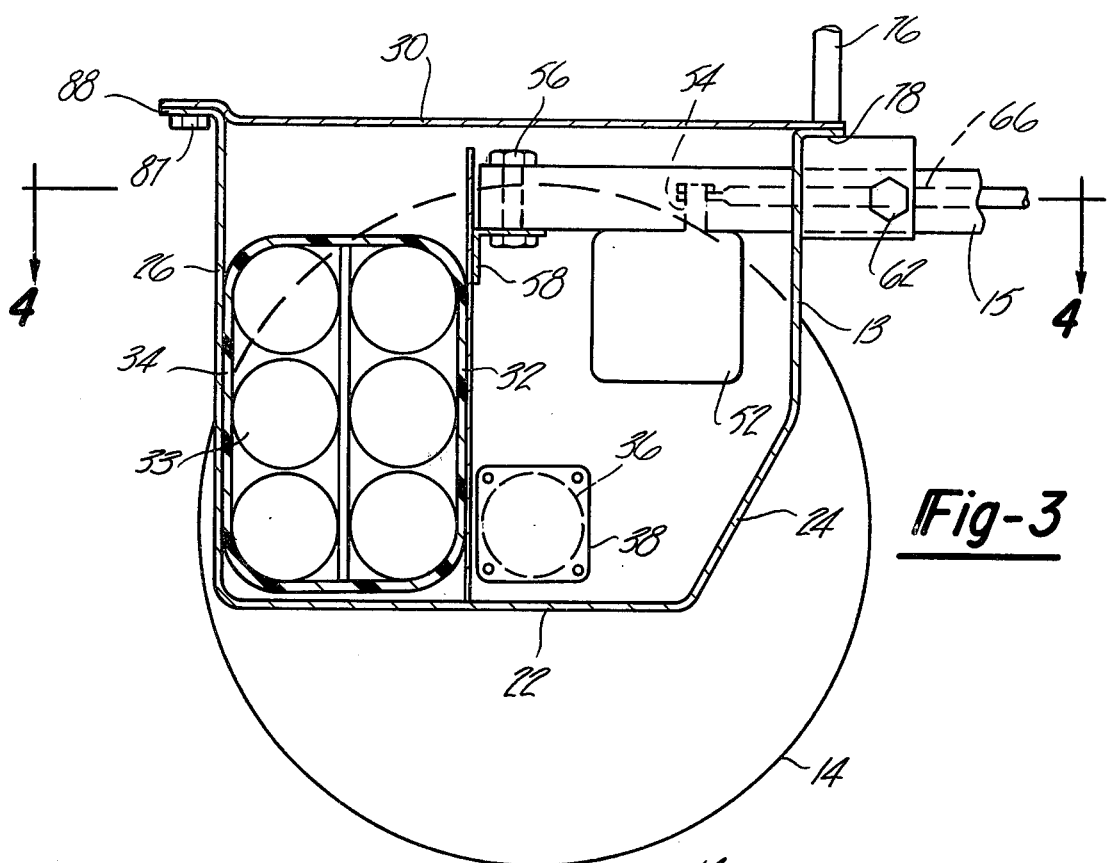
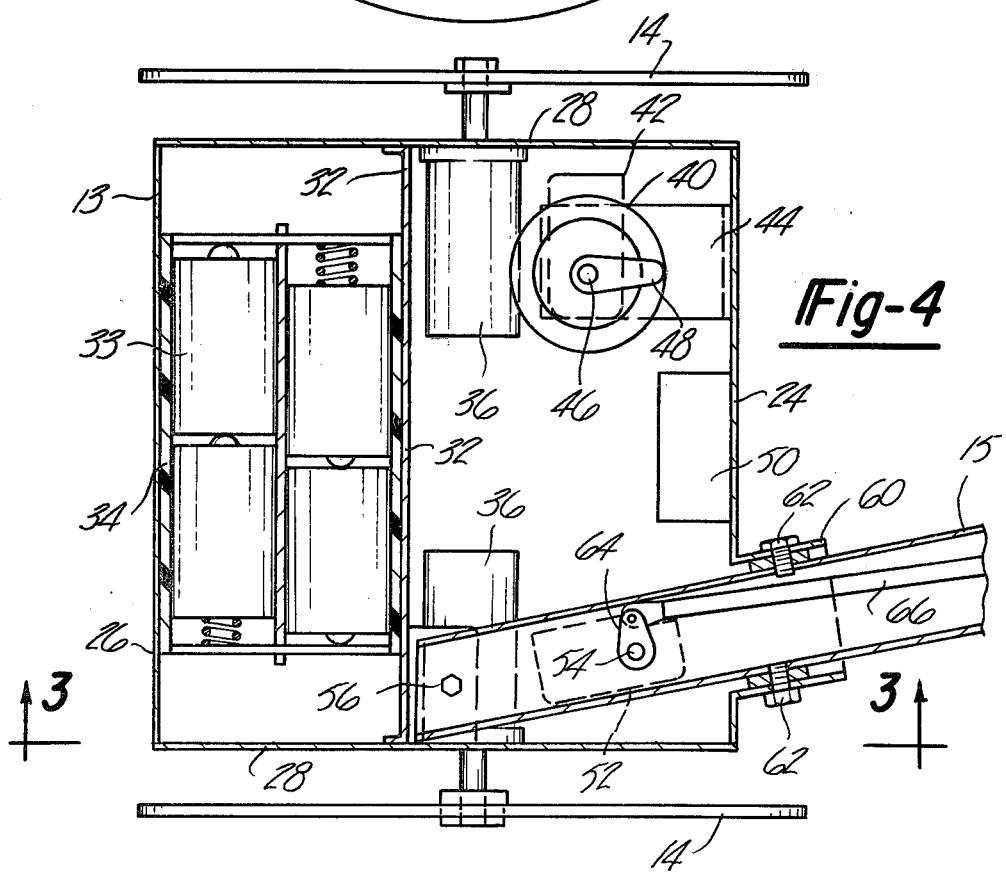

MINIATURE TARGET TANK

BACKGROUND AND SUMMARY OF THE INVENTION

The training of tank gunners has in the past involved the firing of rounds at a stationary target tank simulation, usually a wood tank hull. The present invention is designed to bring a measure of realism into the tank gunner training process by providing for movement of the target tanks under remote control. The tanks are designed as miniature wheeled vehicles about one tenth actual size, e.g. two feet long, one foot high, and fourteen inches wide. The miniature vehicle has a weight of about 26 pounds and a maximum speed of about four miles per hour. The radio control system has a preferred control range of about one quarter mile, sufficient for the technician to see the vehicle and produce evasive maneuvers by visual observation without exposure of the technician to rifle fire hazard.

The invention described herein may be manufactured, used, and licensed by or for the Government for governmental purposes without payment to us of any royalty thereon.

THE DRAWINGS

FIG. 3 is an enlarged view of the body for the FIG. 1 vehicle taken on line 3—3 in FIG. 4.

FIG. 4 is a sectional view taken on line 4—4 in FIG. 3.

Figure 1:
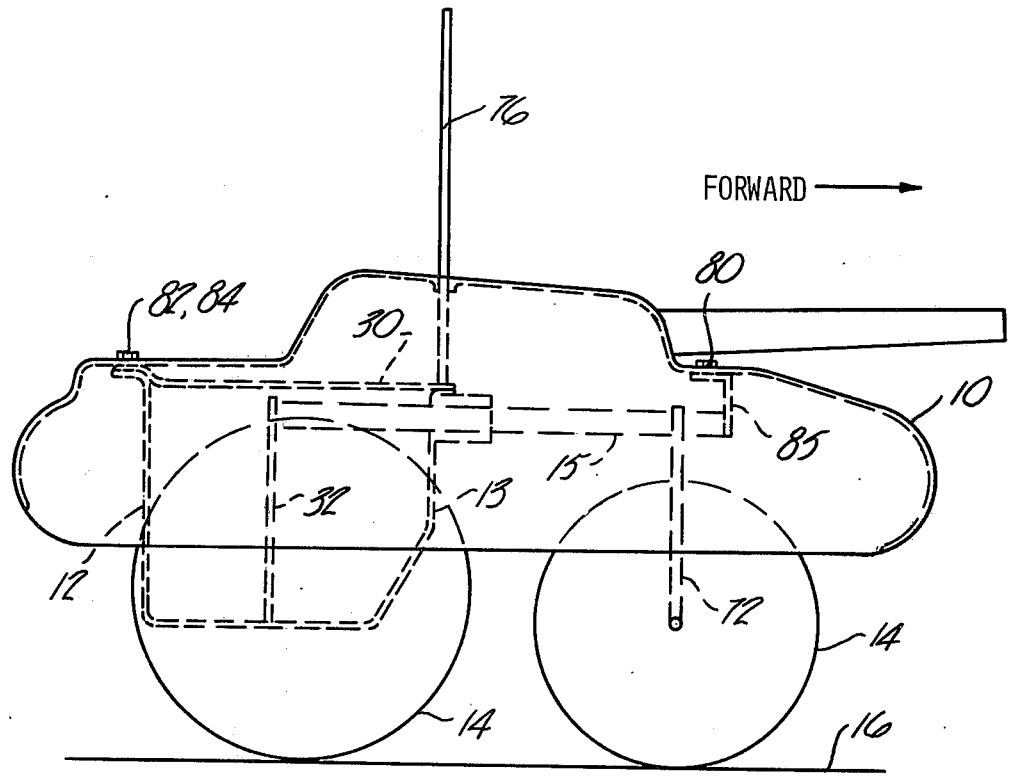
FIG. 1 is a side elevational view of a miniature vehicle embodying this invention.
Figure 2:
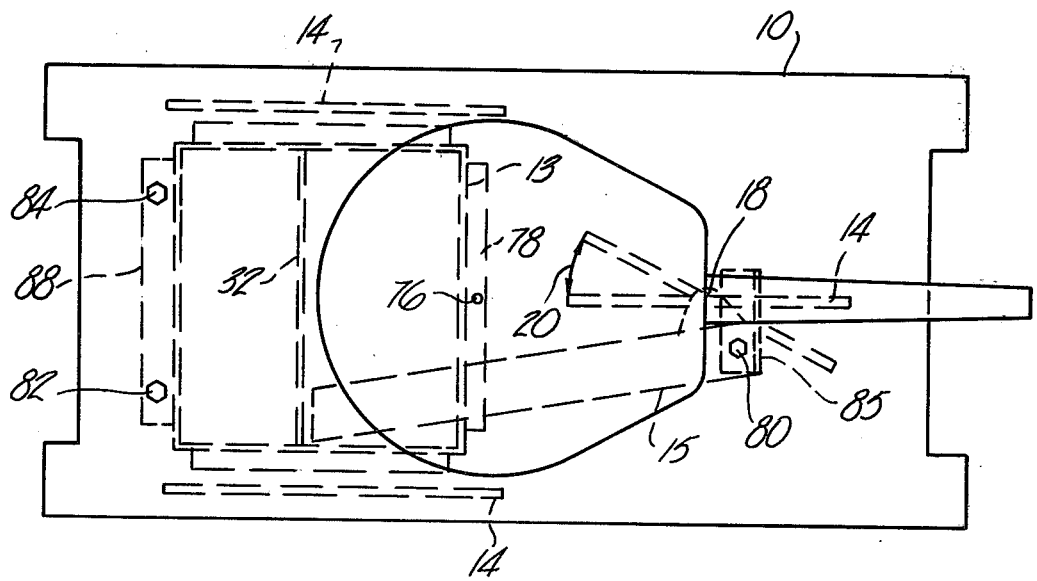
FIG. 2 is a top plan view of the FIG. 1 vehicle.

Referring to FIG. 1, there is shown a three wheeled miniature target tank comprising an ornamental shell 10, a vehicle body 12 disposed generally within and beneath shell 10, and three support wheels 14 carried by the vehicle body for rolling engagement with terrain surface 16. Wheels 14 include two rear wheels powered by electric motors within body 12 and a single forward wheel having a caster leg connection with the vehicle body for swivel adjustment around the vertical axis 18 as denoted by directional arrow 20 in FIG. 2. The rear wheels provide propulsion, and the single front wheel provides steering.

The vehicle body is comprised of a sheet metal box 13 and an elongated hollow tube 15 extending forwardly from the box front wall to a point above the axis of the front wheel. Propulsion and steering motors, batteries, radio receiver, etc. are contained within box 13. Tube 15 houses a connecting rod that extends forwardly from the box to a caster leg at the front wheel. Back and forth movement of the connecting rod produces swivel adjustment of the front wheel for steering purposes.

Box 13 construction is shown best in FIGS. 3 and 4. The box is formed from a single piece of steel armor plate about 0.07 inch thick and suitably bent to define a bottom wall 22, front wall 24, rear wall 26, and two side walls 28. The box is open at its upper end for insertion and/or removal of the propulsion-steering mechanisms during maintenance periods. When the vehicle is in operation during target practice the upper end of the box is closed by a steel cover plate 30.

Preferably the box is equipped with a transverse vertical partition 32 that subdivides the box into a forward compartment and a rearward compartment. The rearward compartment accommodates a battery pack comprised of twenty four flashlight batteries 33 wrapped within a plastic foam blanket 34. The forward compartment accommodates two reversible D.C. motors 36 of conventional construction, for example Globe Industries Division of TRW Incorporated, Dayton, Ohio, type CLLNO.319A109. Each motor preferably includes a mounting flange 38 for bolting the motor to the side wall 28 of the sheet metal box. The shaft of each motor extends outwardly through the box side wall to a fixed connection with the respective wheel disc 14. Each wheel disc may be formed of armor plate about 0.12 inch thick.

Motors 36 may be controlled by a rotor switch or rheostat 40 that is controlled by a conventional servo motor 42 suitably mounted within the box 13 by means of a bracket 44. The servo motor may be a shelf item supplied by Kraft Systems Incorporated of Vista, Calif., its model KPS-16, series 75. The servo output shaft 46 drives a slider arm 48 around the shaft axis to provide suitable modulation or control of the electrical power transmission from batteries 33 to the propulsion motors 36; in one arrangement clockwise movement of slider arm 48 from a neutral position produces forward propulsion of the vehicle wheels 14, whereas counterclockwise movement of the slider arm 48 produces rearward propulsive movement of wheels 14. Servo 42 may be controlled by the electrical output of a radio receiver 50.

Steering of the vehicle is controlled by a second similar servo motor 52 having an output shaft 54 extending upwardly into a rectangular cross section metal tube 15. Tube 15 is anchored to the box 13 by means of a bolt 56 passing downwardly through an angle bracket 58 carried on partition 32. The tube extends forwardly from bolt 56 through a rectangular notch in front wall 24 of the box. The notch edges accommodate a welded U-shaped saddle 60 that provides a seat for the tube and two additional mounting bolts 62. The tube 15 and suspended servo 52 can be removed from box 13 by first removing the three mounting bolts 56 and 62. The upper end of servo shaft 54 carries a crank arm 64 which is pivotally linked to the rear end of connecting rod 66. The forward end of connecting rod 66 is linked to a second crank arm 68, shown best in FIGS. 6 and 7.

Figure 5:
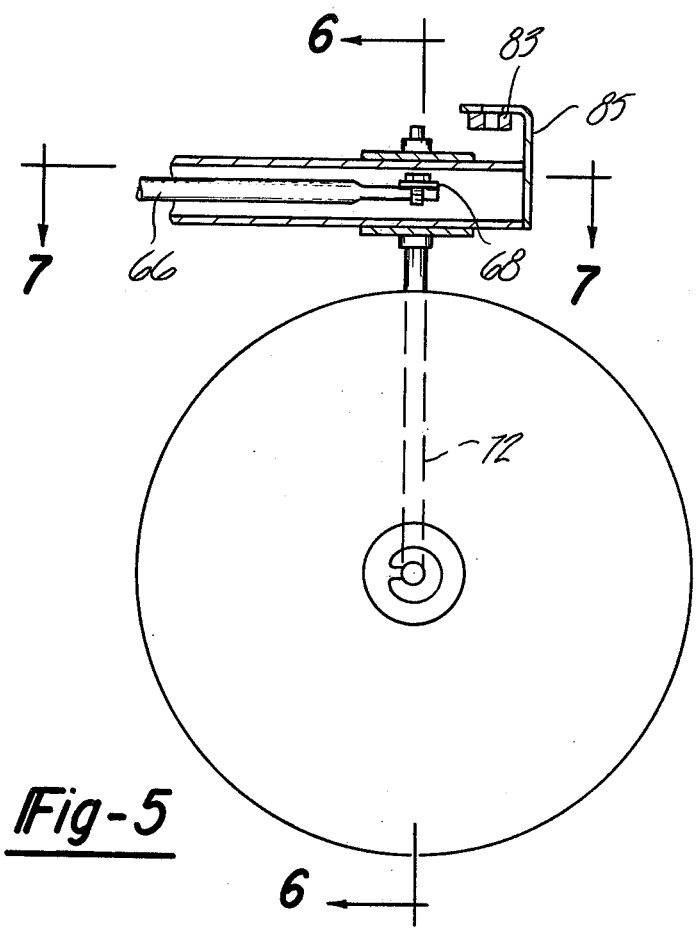
FIG. 5 is an enlarged sectional view of a front wheel assembly in the FIG. 1 vehicle, and taken on line 5—5 in FIG. 6.
Figure 6:
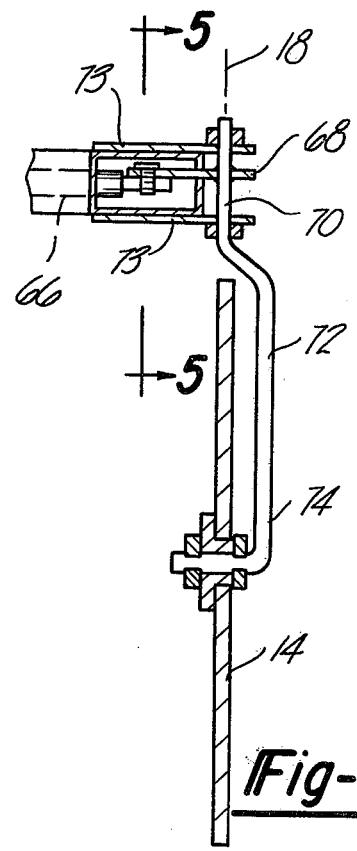
FIG. 6 is a sectional view taken on line 6—6 in FIG. 5.
Figure 7:
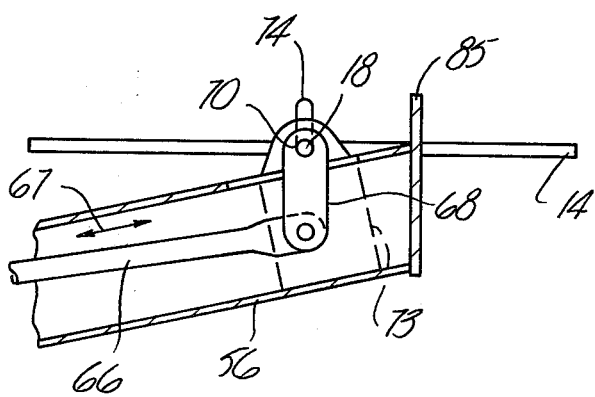
FIG. 7 is a sectional view taken on line 7—7 in FIG. 5.

Referring to FIGS. 5 through 7, the crank arm 68 is connected to the upper vertical section 70 of a rod cross-section caster leg 72. Rod section 70 is free to rotate within vertically aligned openings in two plates 73 welded to tube 15. As best seen in FIG. 6, the caster leg includes a lower vertical section 74 offset from the plane of wheel disc 14 and turned into the wheel to form an axle. Reciprocation of connecting rod 66 as denoted by arrow 67 (FIG. 7) produces swivel movement of the wheel disc 14 around the vertical axis 18 defined by caster leg section 70.

The required reciprocation of rod 66 is obtained from the servo 52. The servo is controlled by one channel of the multi-channel radio receiver 50. The radio receives a signal from a remote sending unit through a conventional antenna 76 suitably mounted on the flange 78 of the box front wall 24. The antenna extends generally vertically upwardly through an opening in the roof area of the ornamental shell 10.

Shell 10 is preferably connected to the circumscribed vehicle body in a detachable fashion, whereby a shell that is damaged by rifle fire can be quickly removed and replaced with a similar undamaged shell. The detachable connection preferably comprises three bolts 80, 82 and 84. Bolt 80 is extended through the shell wall into a nut 83 carried on the undersurface of a mounting bracket 85 welded to the front end of tube 15. Bolts 82 and 84 extend downwardly through the shell into nuts 87 welded to the undersurface of a flange 88 at the upper end of box rear wall 26. The bolts 82 and 84 also can be used to mount cover plate 30 on the box.

The miniature target tank or vehicle is designed to minimize total weight so that a relatively small battery pack 33 can be used while obtaining a reasonably long period of operation between battery changes. Weight economization is made possible by using a relatively light weight ornamental shell of large dimension in combination with a smaller structural body 12. The total weight of body 12 is kept small by forming the body to include an essentially square box 13 and forwardly extending tube 15. The box is sized to be no larger than that necessary to contain all of the propulsion-steering mechanisms. Tube 15 is a structural component that maintains rigidity to the body without significant weight increase.

A particular feature of the construction is that all of the fragile components subject to damage by bullet fire are contained within box 13 or tube 15. The box and tube may be formed of armor plate or bullet-resistant materials to preserve operational integrity of the vehicle even after the vehicle has been subjected to prolonged rifle fire. The wheels 14 for the vehicle are also preferably formed of armor plate to minimize damage from fired projectiles.

We wish it to be understood that we do not desire to be limited to the exact details of construction shown and described for obvious modifications will occur to a person skilled in the art.

We claim:

1. A three-wheeled miniature target vehicle comprising in combination:
   a vehicle body structural component consisting of a sheet metal box (13), and an elongated tube (15) extending from the box in a forward direction;
   ground wheel means comprising a pair of live powered rear wheels (14) having fixed axis drive axles extending into the box, and a single front steered wheel (14) having a caster leg (72) swivel-connected to the forward end of the aforementioned tube;
   means for powering and steering the vehicle comprising a servo-activating radio receiver (50), a propulsion servo motor and propulsion motor means (36) controlled by said servo motor, a steering servo motor (52), and battery means arranged to energize said radio receiver, two servo motors and propulsion motor means; said receiver, two servo motors and propulsion motor means being disposed entirely within the sheet metal box, and said box being formed of armor plate for shielding the box contents against damage by bullets fired at the vehicle;
   the means for steering the vehicle further comprising a force-transmitting connection between the steering servo motor and the aforementioned caster leg at the forward wheel; said force-transmitting connection comprising a first crank arm (64) driven by the steering servo motor, a second crank arm (68) connected to the caster leg, and an elongated connecting rod (66) operatively connecting the two crank arms, said rod being disposed within said tube whereby the tube protects the rod against damage by bullets fired at the vehicle;
   and an expendable ornamental shell simulating the external contour of a military vehicle; said shell including a roof section resting on the vehicle body component, and a downwardly-extending skirt section circumscribing the ground wheel means; the aforementioned tube (15) having its rear end anchored to the box at a point midway between the box front and rear walls; said tube extending forwardly from its anchorage point through a notch in the box front wall so that the tube and box form one rigid assembly.

2. The vehicle of claim 1: said tube having a bolt-type anchorage connection (56) with the box; said steering servo motor being suspended from the tube within the box, whereby the tube and steering servo motor can be removed and replaced as a unit.

3. The vehicle of claim 1: said tube having a bracket at its forward end defining a first upwardly facing mount surface; said box having a flange at its rear end defining a second upwardly facing mount surface; said ornamental shell having roof surfaces thereof adapted to seat on said first and second mount surfaces; and bolt means extending through the shell into the mount surfaces to releasably retain the shell on the vehicle body component.

4. The vehicle of claim 1: said box including a front wall having a forwardly extending flange at its upper end; and a radio receiver antenna mounted on said flange in a vertical attitude; the ornamental shell having an opening therein for accommodating the antenna.

* * * * *